United States Patent Office 3,578,711
Patented May 11, 1971

---

3,578,711
N-(3,4-DICHLOROPHENYL) - 3-[N'-(3,4-DICHLORO-PHENYL)CARBAMOYL]METHYL - 2,2 - DIMETHYLCYCLOBUTANE CARBOXAMIDE
Theodore Largman, Morristown, N.J., and Peter E. Newallis, Leawood, Kans., assignors to Allied Chemical Corporation, New York, N.Y.
No Drawing. Filed July 18, 1968, Ser. No. 745,664
Int. Cl. C07c *103/33*
U.S. Cl. 260—558                   1 Claim

ABSTRACT OF THE DISCLOSURE

N - (3,4 - dichlorophenyl) - 3-[N'-(3,4-dichlorophenyl)carbamoyl]methyl - 2,2 - dimethylcyclobutanecarboxamide is prepared by reaction of 3,4-dichloroaniline with pinic acid chloride in the presence of base. The product is useful as an insecticide and chemosterilant.

BACKGROUND OF THE INVENTION

This invention relates to a new cyclobutanecarboxamide and in particular to N - (3,4-dichlorophenyl)-3-[N' - (3,4 - dichlorophenyl)carbamoyl]methyl-2,2- dimethylcyclobutanecarboxamide which is useful as an insecticide and chemosterilant.

The control of insect populations is often desirable and necessary for sanitary reasons. The most common method for controlling them is by the use of insecticides. In order for an insecticide to be successful it must, of course, be toxic to the insect to be controlled. For some applications, it is desirable that the insecticides be stable and have extended residual activity; for other applications, it is desirable that its useful life be short. For use by unskilled personnel, it should be relatively nontoxic to mammals; in other cases, particularly where it is to be applied by skilled personnel, the mammalian toxicity is less of a factor. Of course, where the insecticide is to be applied to the foliage or roots of plants, or to soil in which the plant is growing, it must be nonphytotoxic, at least at the insecticidal dosage.

Another way to control insects which has greater potential than the use of insecticides is to sterilize them so that they cannot reproduce.

The use of the sterility principle for insect control among one or both members of the species is relatively new and was first successfully employed in the eradication of the screwworm fly (*Cochliomyia hominivorax* (Coquerel)) on the island of Curacao and southeastern part of the United States. This method of insect control possesses vast advantages over simple kill procedures since any beneficial effect that the insect imparts to its natural environment is preserved. Moreover, sterile insects compete with normal insects to reproduce which, in effect, further decreases the possibility for population growth.

Known techniques employing the sterilization principle, however, possess various inherent disadvantages. In the aforementioned eradication of the screwworm fly, male members of the species were sterilized by exposure to gamma radiation followed by release into the area wherein insect reproduction was to be controlled. The irradiation technique possesses obvious limitations. It requires mass release of sterilized insects which often may be undesirable or not even feasible. It requires a rather expensive, uniquely designed plant with specialized equipment to rear, transport and irradiate the insects and then demands means to dispense the packaged, sterilized insects. In many cases the irradiation technique in effecting sterilization drastically reduces the sexual competitiveness of the insects and even kills them. On the other hand, many commercial chemosterilants incorporated in dry feeds must be administered to only newly emerged adult insects. Thus, in order to secure a significant decrease of insect population, use of these chemosterilants requires treating newly emerged adult insects with the chemosterilant prior to the cumbersome procedure of release into their natural environment.

In addition, certain chemosterilants have the disadvantage of being effective only against female insects. It is highly desirable to sterilize males since they transmit, or spread, their sterility among the female population. For this reason, it is better to sterilize a male insect than to kill it. An agent which sterilizes females only, on the other hand, cannot take advantage of this effect since females do not transmit their sterility. Of course, an agent which sterilizes both sexes is especially desirable, particularly when that same agent can be used at higher dosages, if desired, as an insecticide.

SUMMARY OF THE INVENTION

The novel compound of the instant invention is N-(3,4 - dichlorophenyl) - 3 - [N' - (3,4-dichlorophenyl)carbamoyl]methyl - 2,2 - dimethylcyclobutane carboxamide, of the formula:

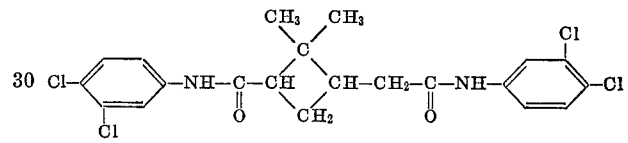

This compound is readily prepared by reaction of 3,4-dichloroaniline with pinic acid chloride, in the presence of base.

When administered to insects, this compound effectively sterilizes both sexes, and at higher dosages, it is useful as an insecticide.

DETAILED DESCRIPTION OF THE INVENTION

Preparation of the instant compound is readily achieved in accordance with the following reaction:

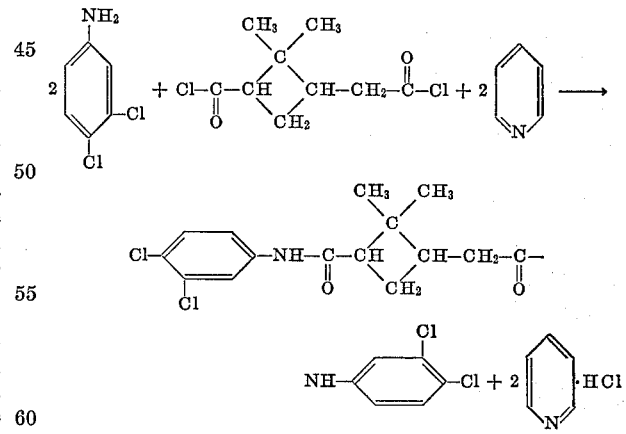

wherein 3 - chloroformyl - 2,2-dimethylcyclobutaneacetyl chloride (pinic acid chloride) and 3,4 - dichloroaniline are condensed. Pyridine is used to absorb the hydrogen chloride which is generated by the condensation. Other bases which might be used in place of the pyridine include triethylamine and other tertiary amines. Preferred bases, such as pyridine, will form a hydrochloride salt which is insoluble in the reaction medium, thereby facilitating isolation of the product. The reaction will not go in an acidic medium.

The reaction may be carried out in any common inert organic solvent such as acetone, benzene, dimethylformamide or carbon tetrachloride. Approximately stoichiometric amounts of the reactants are used, i.e., 2 moles of dichloroaniline per mole of pinic acid chloride. However, an excess of one of the reactants might be used to increase the yield.

Inasmuch as it has been found necessary to remove substantially all the hydrogen chloride from the reaction medium to permit effective condensation, at least a twofold molar excess of base should be used with respect to the theoretical amount of product to be formed. Preferably, a slight excess of base will be used to facilitate the reaction. Normally, the 3,4-dichloroaniline and the base are dissolved in the solvent with stirring, and then the pinic acid chloride is added. The reaction is conveniently conducted at ambient temperature, preferably 20–30° C., and at atmospheric pressure. Higher pressures might be used but are not preferred. After stirring the reaction mixture for about 0.5–2 hours, the precipitated hydrochloride salt is removed by filtration. The filtrate is washed with dilute hydrochloric acid and water to remove traces of hydrogen chloride. The solvent can then be evaporated by distillation to leave the product as a solid residue product, which can be purified by recrystallization from dilute alcohol.

This product is a solid at room temperature. It is soluble in many organic solvents, but is essentially insoluble in water.

Pinic acid chloride, used as reactant in the above synthesis, is prepared by reacting pinic acid with an excess of thionyl chloride in a manner well known to those skilled in the art. Pinic acid, in turn, may be prepared by oxidizing $\alpha$-pinene with permanganate as described in Paul Karrer, Organic Chemistry, page 681, Elsevier Publishing Co., New York, 1946.

N - (3,4-dichlorophenyl)-3-[N'-(3,4-dichlorophenyl,)-carbamoyl]methyl - 2,2 - dimethylcyclobutanecarboxamide has been unexpectedly found to be an effective insecticide and chemosterilant, thereby rendering it an especially useful agent for the control of insects. When used for these purposes, it can be used alone or in combination with other control agents, including insecticides such at DDT, methoxychlor, and other chemosterilants such as methotrexate. It can also be used in conjunction with sex attractants such as methyl eugenol.

The instant compound may be used alone, but will preferably be used in conjunction with a carrier or diluent in an insecticidal or chemosterilant composition. Various diluents may be employed and the percentage of active ingredient will form a proportion of the composition such that a suitable dosage level will be obtained. Although compositions with less than 0.1% by weight of active ingredient may be used, it is preferred to use compositions containing not less than 0.1% of the active agent; otherwise the amount of carrier becomes excessively large. Activity increases with the concentration of the active agent. The composition may contain 10, 50, 75, 95 or an even higher percentage by weight of the active agent.

The particular carrier selected and the proportion of active ingredient to carrier are influenced by the solubility and chemical nature of the compound and the chosen method of use. Solvents such as acetone, methanol, etc. may be used when it is desired to use the instant agent in liquid form. Also, the compound can be used in suspensions, in which case carriers such as water might be employed. When the compound is to be used in solid form, it can be dispersed in materials such as sugar, powdered egg, non-fat dry milk, etc.

Methods for using the agent include spraying solutions or suspensions, dusting with a powder, and admixing the agent in any form with food.

When administered for the purpose of sterilization, it is most convenient to admix the instant compound with a feed-bait composition. The amount of active ingredient to be administered is determined upon consideration of factors such as insect fecundative capabilities, climatic conditions, concentration of insect population and other insect species' characteristics. Generally speaking, concentrations of chemosterilant in the range of from about 0.1 to 1.0 percent by weight based on the amount of feed employed has been found to impart effective sterilization to the insect population sought to be controlled. The concentration of the chemosterilant used should be sufficient to effect sterilization to a significant degree and less than insecticidal concentration since it is not desired to effect substantial mortality among the insect populace. Thus, the concentration utilized should effect tolerable mortality rate, i.e. not greater than 70%. Illustrative of an effective concentration is that amount of chemosterilant used in the examples set forth below. In population control of insects such as the common adult housefly (*Musca domestica*) concentrations below 0.1% did not secure effective sterilization whereas concentrations in excess of 1.0% realized as insect mortality rate in excess of 70%. As previously mentioned, the various factors such as the species to be controlled, environment, biological resistance and activity dictate the concentration range of chemosterilant to be used in order to obtain irreversible sterilization by a simple and economical method. Also, the effect of the instant compound is cumulative, so that small doses over an extended time can be effective as a chemosterilant and eventually will accumulate to a toxic level.

Generally speaking, the feed-bait employed is a substance to which the insect is attracted. Any substance may be employed provided its properties present a desirable substance which the insect consumes. The feed-bait may comprise non-fat dry milk, granulated sugar, powdered eggs, malt, molasses, yeast, or other feeding sources or combinations thereof having incorporated into such feed-bait the chemosterilant. The physical form of such feed is not critical and may be introduced into the insect environment in solution or solid form. In the case of a feed-bait solution, an aqueous solution may be introduced into the environment by conventional means such as spraying or in solid form such as a dust or granulated substance. The solution feed method should comprise an alluring substance, although not necessarily of nutritious value, and the solvent should be free of any effective insecticidal properties. The solid feed-bait procedure utilizes an alluring substance which is coated or impregnated with the chemosterilant. Such a solid feed-bait carrier may readily be prepared by dissolving the solid feed in a solution comprised of the chemosterilant and a suitable solvent followed by slight agitation. The solvent is removed by distillation or evaporation and impregnated feed-carrier isolated. For application as a dust or as granules, the treated feed-bait is pulverized by conventional means.

When administered for insecticidal purposes, the instant compound should be administered in an amount sufficient to provide a toxic level in the insects. When administered in the form of a feed-bait, this is conveniently accomplished by concentration in excess of about 1% by weight based on the amount of feed employed. However, as indicated hereinbefore, the instant compound is cumulative so that extended treatment with lower doses will eventually provide a toxic dosage. The following examples are provided to more fully illustrate the instant invention. They are provided for illustrative purposes only and are not to be construed as limiting the instant invention, which is defined by the appended claim.

EXAMPLE I

To a solution of 8.0 grams (0.049 moles) of 3,4-dichloroaniline in 50 ml. of benzene was added 3.96 grams (0.05 mole) of pyridine. The solution was stirred slowly, and then 5.0 grams (0.0224 mole) of 3-chloroformyl-2,2-dimethylcyclobutaneacetyl chloride was slowly added. After stirring the mixture for an additional 30 minutes, the precipitate pyridine hydrochloride was removed by filtration and the resulting filtrate was washed with dilute hydrochloric acid followed by a water wash. The resulting filtrate was reduced to dryness by flash distillation to afford N-(3,4-dichlorophenyl)-3-[N'-(3,4-dichlorophenyl)carbamoyl]methyl - 2,2-dimethylcyclobutanecarboxamide as a solid residue, 10.3 grams (97% yeild), softening point 81° C. The infrared absorption spectrum showed bands at 1670 cm.$^{-1}$, and 1530 cm.$^{-1}$, indicative of amide and —NH groups.

Analysis.—Calc'd for $C_{21}H_{20}N_2O_2Cl_4$ (percent): N, 5.9. Found (percent): N, 5.64.

EXAMPLE II

Non-systemic test for house fly adults

Dry food (6 parts powdered non-fat dry milk, 6 parts granulated sugar and 1 part powdered egg) was treated with an acetone solution of the instant compound. The solution was added to dry food and the resulting mixture was allowed to dry and was then repulverized. The treated food was placed in emergence cages containing about 50 fly pupae. Cages containing untreated food were used as checks. Examination of each cage was made periodically to determine emergence, conditions of flies, and acute toxicity. Generally seven to nine days after the start of the test, oviposition medium was placed in each cage and on the following day the medium was examined for eggs; if none were present the medium was moistened and examined daily until oviposition occurred or until all adults were dead. Egg viability was determined by inspecting the medium for growing larvae 2–3 days after oviposition. The results of the tests are presented in the following table.

| Percent active ingredient in bait | No. flies | Percent 7-8 day kill | Eggs laid |
|---|---|---|---|
| 1.0 | 47 | 29.8 | None. |
| 0.5 | 49 | 34.7 | Do. |
| 0.25 | 50 | 26.0 | Do. |

EXAMPLE III

Anti-fertility test

Male and female flies were allowed to feed separately for five days on food treated with the compound of the present invention at a concentration of 1% in dry bait. After the five days, the flies were mated and held on check bait for two days. Oviposition medium was supplied at the end of two days and the eggs were collected overnight and were counted the next day. The flies were then held at check bait for four days. At the end of the four days fresh oviposition medium was again supplied and the eggs were collected and counted. The results are presented in the following table.

| | No. of eggs first oviposition medium | Percent hatch | No. of eggs second oviposition medium | Percent hatch |
|---|---|---|---|---|
| Treated males, Untreated females | 170 | None | 285 | 25 |
| Untreated males, Treated females | None | | 90 | 90-100 |
| Untreated males, Untreated females | 240 | 90-100 | 225 | 90-100 |

These results show that the instant compound has substantial anti-fertility activity against flies of both sexes. However, the anti-fertility activity is reduced considerably where the flies are transferred from treated bait and allowed to feed on untreated bait for six days.

EXAMPLE IV

Non-systemic mortality test for house fly adults and anti-fertility test

The procedure of Example II was repeated except that the male and female flies were segregated into different cages. For the anti-fertility tests, male and female emerging adults were segregated by sex into separate cages and fed for five days on baits treated with the compound of the present invention at a concentration of 1.25 grams per cage. Then five flies of each sex were introduced into separate clean cages which contained untreated food. The results of these tests are included in the following table.

Mortality results: percent active ingredients in dry bait, 0.25; male mortality,[1] 5 days, 0/20, 12 days, 15/15; female mortality,[1] 5 days, 0/20, 12 days, 3/15.

| Anti-fertility results | Estimated No. of eggs | Percent hatch |
|---|---|---|
| Treated males, untreated females | 500 | 16 |
| Untreated males, treated females | (¹) | (¹) |

¹ None (in 48 hours).

As can be seen from the test results the compound of the instant invention is more toxic to male than to female flies. This toxicity apears to be gradually cumulative and reversible. Thus, if flies which have been exposed to food treated with the compound of the instant invention for a given number of days, are exposed to untreated food, the net result may be no toxicity.

The compound of the present invention has also a pronounced effect in sterilizing female flies. A treated female is prevented from mating for prolonged periods of time.

EXAMPLE V

Follow-up anti-fertility test

The procedure of Example III was repeated, wherein adult flies were segrated by sex and fed on 0.25% treated bait for five days. The treated flies were then mated with untreated flies and exposed to untreated food for eight days. Oviposition medium was supplied to the cages seven days after the flies were exposed to untreated food and the eggs were collected on the eight day. The results of the test are listed in the following table.

| Treatment | No. of eggs | Percent hatch |
|---|---|---|
| Treated male, untreated female | 300 | 16 |
| Untreated male, treated female | 160 | 100 |
| Untreated male, untreated female | 520 | 100 |

The results show that treated females which had not previously produced, laid some viable eggs after eight days on untreated food. Low male fertility did not change in this period.

EXAMPLE VI

Anti-fertility test

Twenty-five grams of dry larval medium was saturated with 50 ml. malt-yeast (10 cc. malt; 25 gm. yeast made up to 450 cc. in water) solution containing the compound of the instant invention in solution. The treated medium was then placed in glass jars, approximately 100 eggs were added and the jars were then placed in emergence cages. Jars containing untreated medium were used as checks. The jars were checked periodically to determine whether eggs hatched, for larval abnormalities or mortality. After adults in the check jars had emerged, all cages were examined for emergence and the medium examined for delayed larvae or pupae. Four or five days after emergence the flies were offered oviposition medium and the eggs were checked for hatching. A portion of the eggs were placed in untreated medium to observe abnormalities in another generation. The results are listed in the following table.

[1] Results given in number of deaths per number of flies treated.

| Percent active ingredient in liquid medium | No. pupated | No. adults | Percent mortality | Estimated No. eggs | Percent hatch |
|---|---|---|---|---|---|
| 0.5 | None | | | | |
| 0.2 | 17 | 16 | [1] 81 | [2] 65 | 75 |
| 0.1 | 83 | 60 | [1] 38 | 285 | [3] |
| Untreated | 98 | 94 | 0 | 1,000+ | 100 |

[1] Delayed action-kill after normal emergence.
[2] Laid by one small surviving female mated to untreated males.
[3] Medium too moist, few live maggots—second egg collection produced 410 eggs—100% normal hatch.

What is claimed is:
1. N - (3,4 - dichlorophenyl) - 3 - [N' - (3,4 - dichlorophenyl) - carbamoyl] methyl - 2,2 - dimethylcyclobutane-carboxamide.

References Cited
UNITED STATES PATENTS 3,133,924   5/1964   Wilson et al. _____ 260—557

HENRY R. JILES, Primary Examiner

H. I. MOATZ, Assistant Examiner

U.S. Cl. X.R.

424—324